(12) United States Patent
Wentworth et al.

(10) Patent No.: US 9,315,172 B1
(45) Date of Patent: Apr. 19, 2016

(54) CONVEYOR ASSEMBLY INCLUDING A TRAPDOOR ASSEMBLY HAVING A DEVICE

(71) Applicant: Motor City Wash Works, Inc., Wixom, MI (US)

(72) Inventors: Robert Wentworth, Farmington Hills, MI (US); Douglas J. Calvin, Livonia, MI (US)

(73) Assignee: Motor City Wash Works, Inc., Wixom, MI (US)

( * ) Notice: Subject to any disclaimer, the term of this patent is extended or adjusted under 35 U.S.C. 154(b) by 0 days.

(21) Appl. No.: 14/663,870

(22) Filed: Mar. 20, 2015

(51) Int. Cl.
  *B65G 19/00* (2006.01)
  *B60S 3/00* (2006.01)
  *B65G 19/02* (2006.01)
  *B65G 19/18* (2006.01)

(52) U.S. Cl.
  CPC .................. *B60S 3/004* (2013.01); *B65G 19/02* (2013.01); *B65G 19/185* (2013.01)

(58) Field of Classification Search
  CPC ........ B65G 47/84; B65G 19/00; B65G 19/02; B65G 2207/40; B60S 3/004
  USPC .................. 198/735.3, 735.4, 860.4, 719; 104/172.3; 134/123, 124
  See application file for complete search history.

(56) References Cited

U.S. PATENT DOCUMENTS

| | | | | |
|---|---|---|---|---|
| 3,554,132 A * | 1/1971 | Hanna | ..................... | B61B 10/04 104/172.3 |
| 3,614,002 A * | 10/1971 | Dore | ...................... | B02C 17/02 241/21 |
| 3,844,222 A * | 10/1974 | Eller | ...................... | B65G 19/02 104/172.3 |
| 3,892,398 A | 7/1975 | Marsh | | |
| 3,972,415 A * | 8/1976 | Rohde | .................... | B65G 47/78 198/359 |
| 4,753,337 A * | 6/1988 | Grosjean | .................. | A62C 2/22 198/583 |
| 8,328,003 B2 * | 12/2012 | Webster | ............... | B66B 31/006 104/172.3 |
| 2010/0300323 A1 * | 12/2010 | Ennis | ..................... | B60S 3/004 104/172.3 |

OTHER PUBLICATIONS http://www.fsip.com/.

* cited by examiner

*Primary Examiner* — James R Bidwell
(74) *Attorney, Agent, or Firm* — Quinn Law Group, PLLC (57) ABSTRACT

A conveyor assembly is provided for movably supporting a tire of a vehicle. The conveyor assembly includes a track, a dolly, and a trapdoor assembly. The track is configured for supporting the tire of the vehicle. The track terminates at an edge, and a gap is defined beyond the edge. The dolly is configured to move along the track to the edge so as to guide the tire along the track to the edge. The trapdoor assembly is configured to substantially cover the gap when in a closed position and is movable to an open position to uncover the gap and allow the dolly to translate around the edge. The trapdoor assembly includes a device configured to prevent a human from inadvertently opening the trapdoor assembly.

22 Claims, 5 Drawing Sheets

United States Patent US 9,315,172 B1

CONVEYOR ASSEMBLY INCLUDING A TRAPDOOR ASSEMBLY HAVING A DEVICE

TECHNICAL FIELD

The present disclosure is related to a conveyor assembly including a trapdoor assembly having a device.

BACKGROUND

Conveyor assemblies for vehicles, such as automobiles and the like, are used in car washes and other applications to move the vehicle across a horizontal surface. A track extends along the horizontal surface. On demand, a dolly may rise out of an opening at an entrance end of the conveyor assembly to engage a tire of the vehicle. The dolly is driven by a chain to advance the vehicle along the conveyor until the vehicle exits and the dolly drops below the horizontal surface to eventually return to the entrance end of the conveyor. The dollies have two alternative paths relative to the track. One path is below the horizontal surface, where the dolly is out of the way while still being advanced by the chain, when a vehicle is not present to be moved along the track. The other path is above the horizontal surface, where the dolly is capable of moving the vehicle as the chain advances.

SUMMARY

In one possible aspect of the disclosure, a conveyor assembly is provided for movably supporting a tire of a vehicle. The conveyor assembly includes a track, a dolly, and a trapdoor assembly. The track is configured for supporting the tire of the vehicle. The track terminates at an edge, and a gap is defined beyond the edge. The dolly is configured to move along the track to the edge so as to guide the tire along the track to the edge. The trapdoor assembly is configured to substantially cover the gap when in a closed position and is movable to an open position to uncover the gap and allow the dolly to translate around the edge. The trapdoor assembly includes a device configured to prevent a human from inadvertently opening the trapdoor assembly.

In another possible aspect of the disclosure, a trapdoor assembly is provided for a conveyor assembly having a support structure, a track terminating at an edge, and a dolly movable along the track. The trapdoor assembly includes a trapdoor assembly. The trapdoor assembly is configured to substantially cover a gap defined beyond the edge when in a closed position and is movable to an open position to uncover the gap and allow the dolly to translate around the edge. The trapdoor assembly includes a device configured to prevent a human from inadvertently opening the trapdoor assembly The above features and advantages and other features and advantages of the present teachings are readily apparent from the following detailed description of the best modes for carrying out the present teachings when taken in connection with the accompanying drawings.

DETAILED DESCRIPTION

Figure 1:
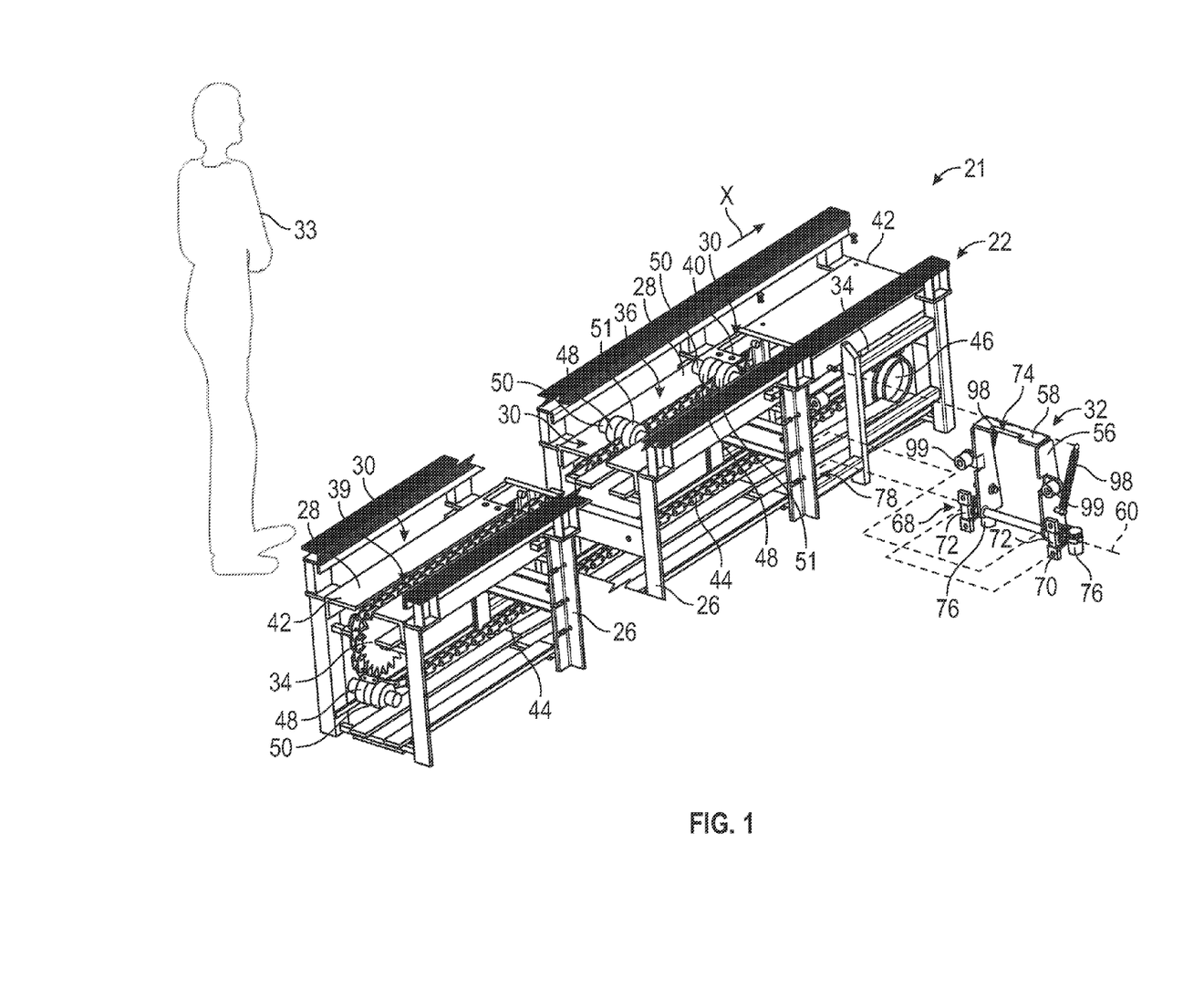
FIG. 1 is a schematic exploded perspective view of a conveyor system for use with a car wash, with the conveyor system including a conveyor assembly that is broken and that includes a trapdoor assembly.

Referring to the drawings, wherein like reference numbers refer to like components throughout the several Figures, a conveyor system 20 for use with a vehicle washing system 21 is shown schematically in FIG. 1. The conveyor system 20 includes a conveyor assembly 22. The conveyor assembly 22 is configured to convey a vehicle 24 through the vehicle washing system 21.

The conveyor assembly 22 includes a support structure 26, a track 28, a plurality of translation members 30, and a trapdoor assembly 32. The support structure 26 operatively supports the track 28 and a pair of sprockets 34. The track 28 presents a support surface 36 that is configured to movably support a tire 38 of the vehicle 24. The track 28 defines a channel 39 that extends to an edge 40. The conveyor assembly 22 extends between opposing ends 42. The sprockets 34 are disposed proximate the opposite ends 42 of the conveyor assembly 22.

Figure 2:
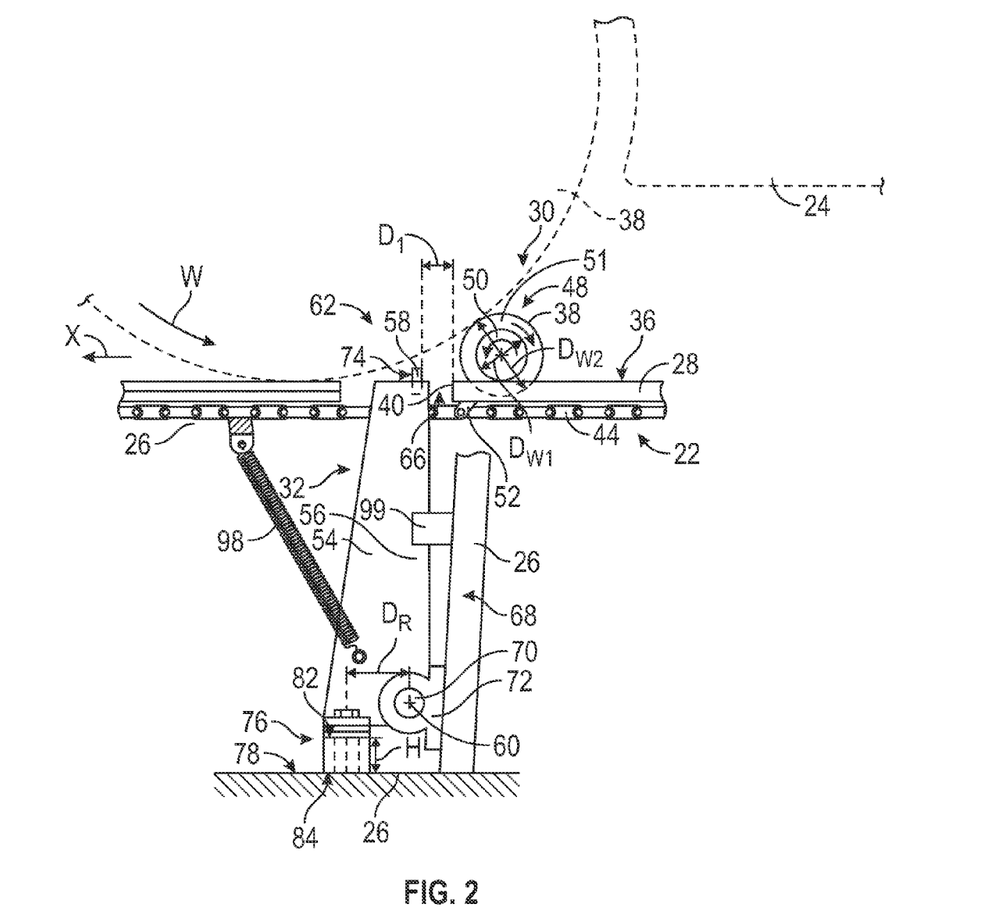
FIG. 2 is a schematic side view of a tire of a vehicle supported by the conveyor assembly with the tire being pushed by a roller of a translation member and with the trapdoor assembly in a closed position.
Figure 3:
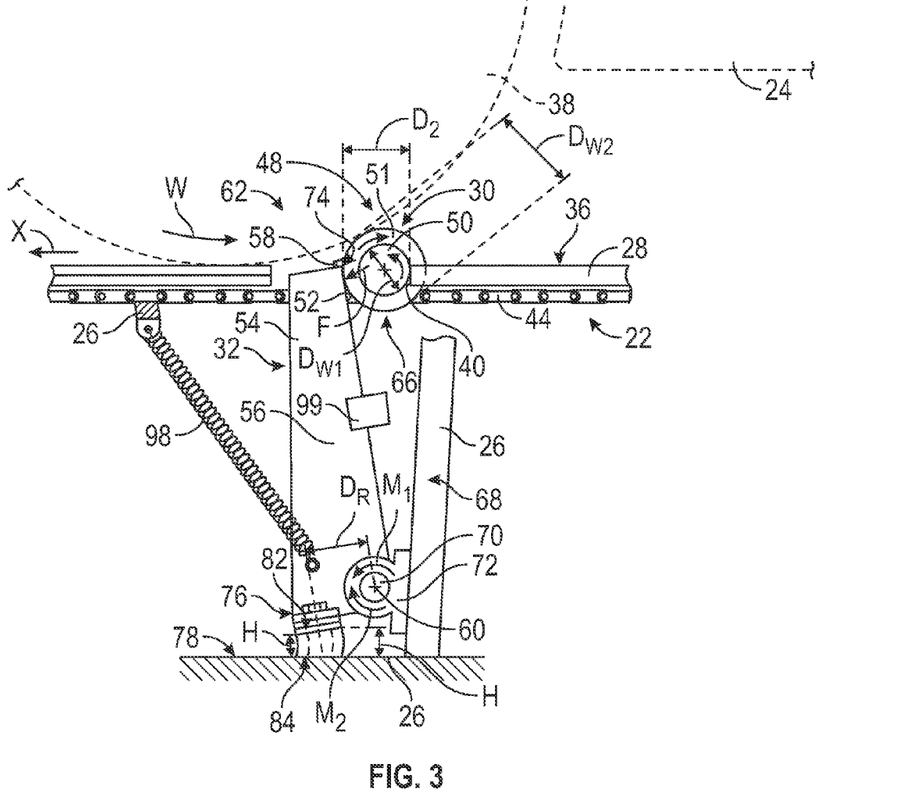
FIG. 3 is a schematic side view of the tire of the vehicle supported by the conveyor assembly with the tire being pushed by the roller of the translation member and with the trapdoor assembly in an open position.

A chain 44, such as an endless chain 44, extends about the pair of sprockets 34, as may be known to those skilled in the art. The sprockets 34 may be driven or otherwise rotated by a motor 46 to move the chain 44. The chain 44 is operatively disposed opposite the support surface 36, i.e., beneath the track 28. The translation members 30 may be operatively attached to the chain 44, in series. In response to moving the chain 44, each translation member 30 is configured to move along the support surface 36 of the track 28, while pushing a tire 38 of the vehicle 24, to the edge 40 of the track 28. In one non-limiting embodiment, with reference to FIGS. 1-3, the translation member 30 may be a dolly, as known in the related art. Referring now to FIGS. 2 and 3, each translation member 30 may include a roller assembly 48 having at least one first roller 50 that rolls along the support surface 36 in response to movement of the chain 44 and a second roller 51 to, in turn, push the respective tire 38, causing the tire 38 to roll (arrow W) and the vehicle 24 to move in a forward direction (arrow X). The second roller 51 extends into the channel 39 defined along the track 28 such that the second roller 51 is free to rotate in a direction opposite the rotation of the tire 38. Referring to FIGS. 2 and 3, the roller assembly 48 may include linkage 52 that operatively connects the roller assembly 48 to the chain 44. The first roller(s) 50 of the translation member 30 is supported by the support surface 36. The first roller 50 may have a diameter $D_{W1}$ that is smaller than a diameter $D_{W2}$ of the second roller 51.

The trapdoor assembly 32 is movably disposed proximate the edge 40 of the track 28. More specifically, the trapdoor assembly 32 may be pivotally disposed proximate the edge 40 of the track 28. The trapdoor assembly 32 includes a housing 54 having a pair of stanchions 56 and an apply member 58.

The housing 54 may also be referred to as a weldment. The stanchions 56 may be disposed in spaced relationship to one another and may be pivotally attached to the support structure 26 such that the trapdoor assembly 32 rotates about a pivot axis 60 as the trapdoor assembly 32 moves between a closed position 62, illustrated in FIG. 2, and an open position 64, illustrated in FIG. 3. The apply member 58 may be operatively attached to the pair of stanchions 56 such that the apply member 58 is disposed in generally perpendicular relationship to the pair of stanchions 56. As such, the apply member 58 is operatively attached to the stanchions 56 in radially spaced relationship to the pivot axis 60. The chain 44 extends between the pair of stanchions 56, the apply member 58, and the pivot axis 60. The apply member 58 is positioned relative to the edge 40 of the track 28 such that an opening or gap 66 is defined between the edge 40 of the track 28 and the apply member 58.

Referring again to FIG. 1, the trapdoor assembly 32 may also include a pivot assembly 68 that pivotally connects the pair of stanchions 56 to the support structure 26. The pivot assembly 68 allows the trapdoor assembly 32 to pivot relative to the support structure 26 between the closed position 62 and the open position 64. The pivot assembly 68 includes an axle 70 that is operatively disposed along the pivot axis 60 and that operatively interconnects the pair of stanchions 56 such that the axle 70 is disposed in spaced and generally parallel relationship to the apply member 58. The pivot assembly 68 includes at least one support member 72, e.g., a pillow block bearing, operatively attached to both the axle 70 and the support structure 26. Referring to FIG. 1, the trapdoor assembly 32 includes a pair of support member 72 disposed in spaced relationship to one another such that the housing 54 is disposed therebetween. The support members 72 are operatively attached to the support structure 26 such that the pivot assembly 68 allows the housing 54 of the trapdoor assembly 32 to pivot relative to the edge 40 of the track 28 between the closed position 62 (FIG. 2) and the open position 64 (FIG. 3).

The trapdoor assembly 32 is pivotable, relative to the edge 40 of the track 28, between the closed position 62 (FIG. 2) and the open position 64 (FIG. 3), in response to the application of a force $F_1$ to an apply surface 74 of the apply member 58 by the roller assembly 48 of the translation member 30, as the roller assembly 48 passes the edge 40 of the track 28. The apply surface 74 faces the edge 40 of the track 28. Referring to FIG. 2, the gap 66 may be defined between the apply surface 74 and the edge 40 of the track 28 when the trapdoor assembly 32 is in the closed position 62. However, it should be appreciated that the apply surface 74 and the edge 40 of the track 28 may also be in abutting or otherwise overlapping relationship to one another when the trapdoor assembly 32 is in the closed position 62. When the gap 66 is defined between the apply surface 74 and the edge 40 of the track 28 when the trapdoor assembly 32 is in the closed position 62, the gap 66 between the apply surface 74 and the edge 40 of the track is a first distance $D_1$. The first distance $D_1$ may be sufficiently small so as to prevent the first and second rollers 50, 51 of the dolly 30 from moving through the gap 66. Therefore, when the trapdoor assembly 32 is in the closed position 62, the roller(s) 50, 51 of the translation members 30 are prevented from moving through the gap 66. However, when the translation member 30 passes the edge 40 of the track 28, the second roller 51 of the translation member 30 contacts the apply surface 74 of the trapdoor assembly 32 and applies the force $F_1$ thereto, by virtue of the chain 44 being driven by the motor 46. Therefore, the translation member 30 is pulled along the track 28 as the chain 44 moves relative to the track 28. As the first roller 50 of the translation member 30 reaches the edge 40 of the track 28, the second roller 51 contacts the apply surface 74 and applies the force $F_1$ to the apply surface 74 of the trapdoor assembly 32 until the trapdoor assembly 32 moves from the closed position 62 to the open position 64.

The force $F_1$ is exerted on the apply surface 74 of the apply member 58 of the trapdoor assembly 32 in a direction away from, or opposite, the edge 40 of the track 28, such that a first moment $M_1$ about the pivot axis 60, i.e., in a first direction (arrow $M_1$) is generated. The application of the force $F_1$ to the apply member 58 causes the trapdoor assembly 32 to move away from the edge 40 of the track 28 only when the force $F_1$ is at least equal to an activation force $F_A$, that can be imparted onto the apply member 58 by the translation member 30. The activation force $F_A$ is configured to be a force that causes the trapdoor assembly 32 to move from the closed position 62 in response to the application of the force $F_1$ by the translation member 30, while also being a force $F_A$ that is configured to prevent an inadvertent movement of the trapdoor assembly 32 from the closed position 62 to the open position 64 when a force is being applied to the trapdoor assembly 32 by something other than the translation member 30. In the embodiments illustrated in FIGS. 1-3, application of the force $F_1$ to the apply member 58 causes the trapdoor assembly 32 to pivot about the pivot axis 60, away from the edge 40 of the track. Pivoting, or otherwise moving, the trapdoor assembly 32 away from the edge 40 of the track 28, causes the first distance $D_1$ to increase until a second distance $D_2$ is achieved, i.e., a size of the gap 66 is increased. As illustrated in FIG. 3, the second distance $D_2$ is at least equal to the diameter $D_{W1}$ of the first roller 50, plus a portion of the diameter $D_{W2}$ of the second roller 51 that extends beyond the diameter of the first roller 50. More specifically, with continued reference to FIG. 3, the second distance $D_2$ may be equal to $\frac{1}{2} D_{W1} + \frac{1}{2} D_{W2}$. The increase of the size of the gap 66 from the first distance $D_1$ to the second distance $D_2$ allows the roller assembly 48 to travel through the gap 66 and fit between the edge 40 of the track 28 and the apply surface 74 of the trapdoor assembly 32 such that the translation member 30 drops below the track 28 and is able to continue to move with the chain 44, as the chain 44 eventually moves about the respective sprocket 34 and the respective translation member 30 is returned in the opposite direction, as is known to those skilled in the art.

The trapdoor assembly 32 also includes at least one device 76 configured to allow movement of the trapdoor assembly 32, relative to the edge 40 of the track 28, from the closed position 62 to the open position 64, in response to the translation member 30 being proximate the edge 40 of the track 28. Likewise, the device 76 is configured to prevent movement of the trapdoor assembly 32, relative to the edge 40 of the track 28, from the closed position 62 to the open position 64, when the translation member 30 is not proximate the edge of the track 28. In one non-limiting example, the translation member 30 may be in contact relationship with the trapdoor assembly 32, as illustrated in FIG. 3. Referring again to FIG. 1, the device 76 is configured to prevent a human 33 from inadvertently opening the trapdoor assembly 32. Therefore, the device 76 is configured such that the activation force $F_A$ required to move the trapdoor assembly 32 to the open position 64 is greater than a force applied by a member of a human body 33, such as a hand, arm, foot, knee, leg, and the like, where the force applied by a member of the human body 33 is not assisted by other than the human body 33.

Figure 5A:
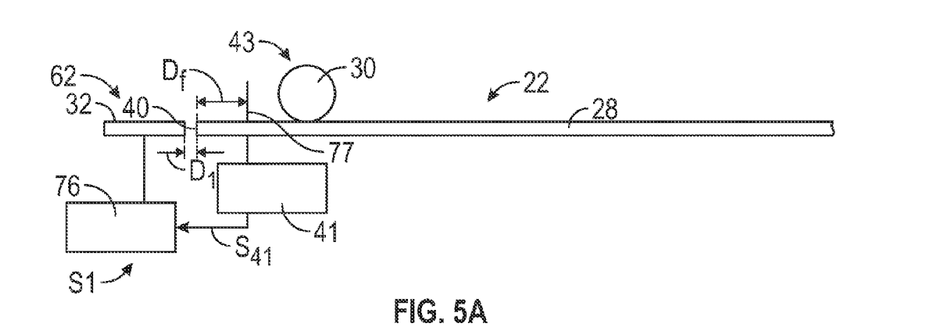
FIG. 5A is a schematic diagrammatic side view of the conveyor system of FIG. 1 including a track, a translation member, a trapdoor assembly, and a proximity sensor, illustrating the trapdoor assembly in a closed position.
Figure 5B:
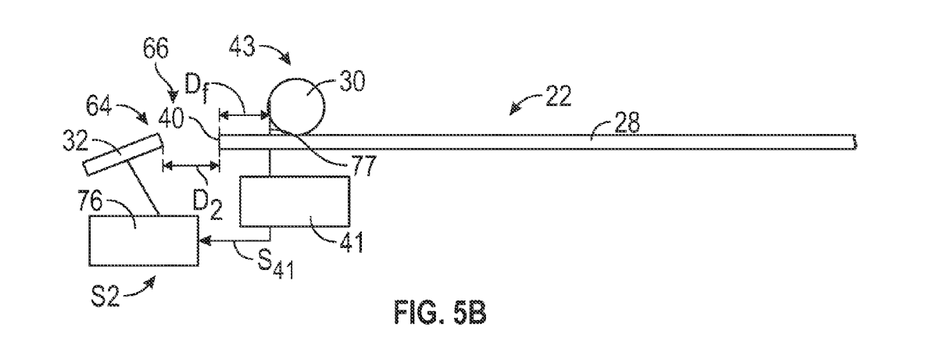
FIG. 5B is a schematic diagrammatic side view of the conveyor system of FIG. 1, illustrating the trapdoor assembly in an open position.

In another non-limiting example, the translation member 30 being proximate the edge 40 of the track 28 is defined as being at a location 77 that is spaced along the track a functional distance $D_f$ from the edge 40, as illustrated in FIG. 5B. The conveyor assembly 22 may include a proximity sensor 41 configured to detect when a tracked object 43, such as the translation member 30, is proximate to the edge 40, i.e., spaced the functional distance $D_f$ from the edge 40, to, in turn, transmit a signal S41 to the device 76. Upon receipt of the signal S41 from the proximity sensor 41, the device 76 may automatically move from a locked state S1 (FIG. 5A) to an unlocked state S2 (FIG. 5B), where the translation member 30, in turn, contacts and moves the trapdoor assembly 32 from the closed position 62 to the open position 64. In the locked state S1, the device 76 acts as a latch to prevent the movement of the trapdoor assembly 32 from the closed position 62 to the open position 64. Likewise, in the unlocked state S2, the device 76 allows the movement of the trapdoor assembly 32 from the closed position 62 (FIG. 5A) to the open position 64 (FIG. 5B).

With continued reference to FIGS. 5A, 5B, in yet another non-limiting example, upon receipt of the output signal S41, the device 76 functions to automatically move the trapdoor assembly 32 from the closed position 62 (FIG. 5A) to the open position 64 (FIG. 5B). Likewise, the device 76 may also be configured to automatically move from the open position 64 (FIG. 5A) to the closed position 62 (FIG. 5B) once a predetermined amount of time has elapsed since the receipt of the signal S41; upon receipt of another signal from another proximity sensor (not shown) that senses the translation member 30 has moved from the edge 40 of the track 28 and through the gap 66; and the like. In this non-limiting example, the device 76 may include at least one actuator, such as a hydraulic cylinder, a pneumatic cylinder, a motor, and the like, that is configured to selectively move the trapdoor assembly 32, relative to the edge 40 of the track.

Referring again to the embodiment shown in FIGS. 1-4, the device 76 may be referred to as a biasing device 76. Each trapdoor assembly 32 includes at least one biasing device 76. Referring to FIG. 1, each trapdoor assembly 32 may include a pair of biasing devices 76. The biasing devices 76 may be operatively attached to the respective stanchions 56 of the housing 54 such that the biasing devices 76 are disposed in spaced relationship to one another and are each disposed arcuately opposite the apply surface 74 of the apply member 58 of the trapdoor assembly 32. Each biasing device 76 is configured to react between a reaction surface 78 and the respective stanchion 56 to provide resistance to rotation of the trapdoor assembly 32 about the pivot axis 60 from the closed position 62 to the open position 64. More specifically, each biasing device 76 is elastically compressible and provides resistance to movement of the trapdoor assembly 32 from the closed position 62 to the open position 64. The biasing device 76 provides a restoring force $F_2$ to the trapdoor assembly 32 when the trapdoor assembly 32 is not in the closed position 62 to bias the trapdoor assembly 32 toward the closed position 62. The reaction surface 78 may be part of the support structure 26. However, it should be appreciated that the reaction surface 78 may be part of any other structure, so long as the support surface 78 provides a surface for the biasing device 76 to react against. Therefore, the biasing device(s) 76 are configured to react between the reaction surface 78 and the stanchion 56 to apply a second moment $M_2$ about the pivot axis 60, i.e., in a second direction (arrow $M_2$) opposite the first direction (arrow $M_1$), to counteract the first moment $M_1$, as the force $F_1$ is applied to the apply surface 74. It should also be appreciated that the biasing device may optionally be attached to the reaction surface 78, such that the biasing device 76 still reacts between the reaction surface 78 and the stanchion 56.

Figure 4:
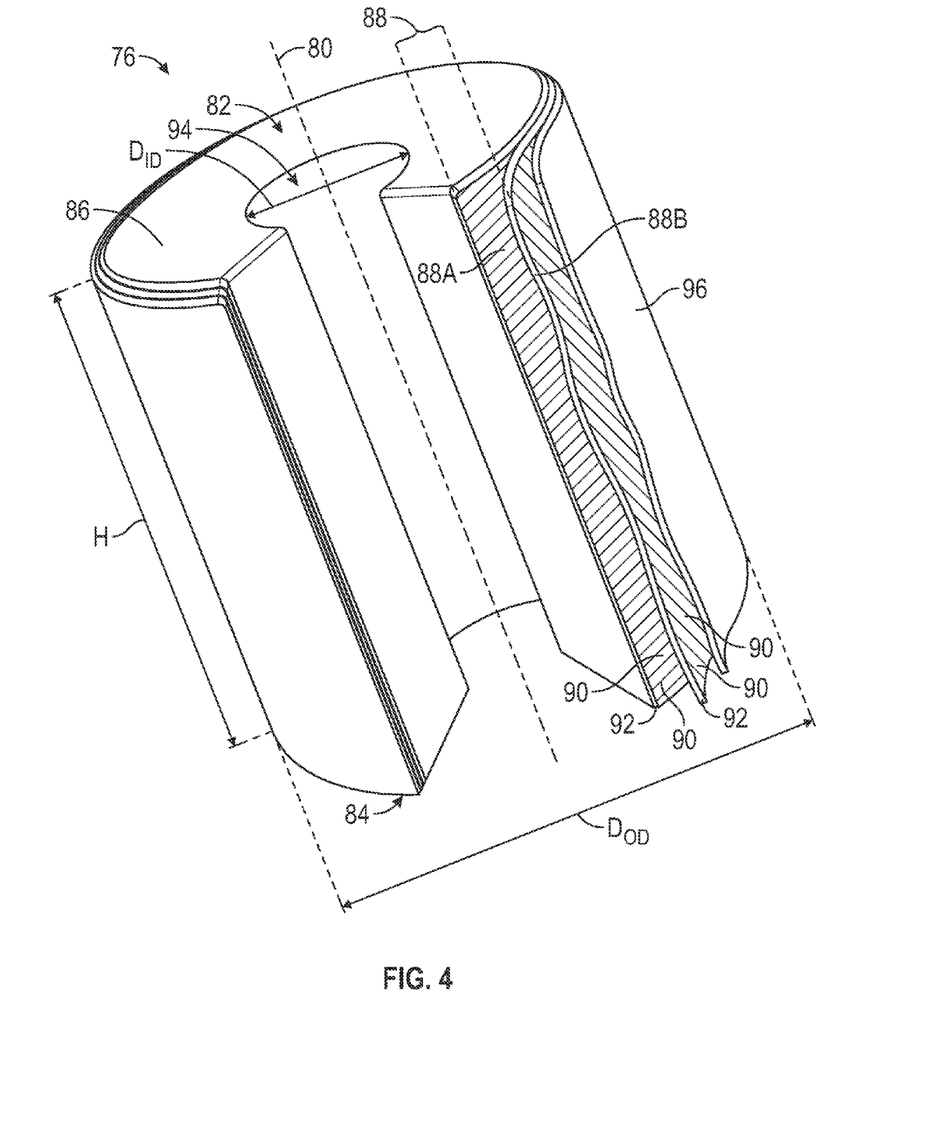
FIG. 4 is a schematic perspective view of a biasing device of the trapdoor assembly having a core, reinforcing layers, and a covering, with the reinforcing layers and a covering illustrated as being partially peeled away from a core.

The biasing device 76 may be a spring, such as a compression spring. Referring to FIG. 4, an exemplary biasing device 76 is illustrated. Each biasing device 76 extends along a biasing axis 80 between a first face 82 and a second face 84. The first face 82 is configured to be acted on by the stanchion 56 and the second face 84 is configured to be acted on by the support surface 36, in response to the force $F_1$ being applied to the apply surface 74 by the translation member 30. Each biasing device 76 is attached to the respective stanchion 56 such that the biasing axis 80 is spaced a radial distance DR from the pivot axis 60. As such, the biasing device 76 is pivotable, with the housing 54, about the pivot axis 60. The biasing axis 80 may be generally perpendicular to, and non-coincident with, the pivot axis 60. The biasing device 76 is configured to be loaded along the biasing axis 80 such that the biasing device 76 is compressed along the biasing axis 80. Alternatively, the biasing device 76 may be attached to the support structure 26 or another surface such that the first face 82 of the biasing device 76 is acted on by the stanchion 56.

Referring now to FIG. 4, the biasing device 76 includes a core 86 and at least one reinforcing layer 88. The core 86 extends along the biasing axis 80 and comprises an elastomeric material, such as rubber and the like. The reinforcing layer 88A, 88B axially surrounds the core 86 to provide lateral support to the core 86, i.e., normal to the biasing axis 80, as the biasing device 76 is compressed along the biasing axis 80. The reinforcing layer 88 may be at least two layers 88A, 88B, where each reinforcing layer 88 includes a plurality of cords 90 covered with elastomeric material 92. The cords 90 of each support layer 88A, 88B may be biased, i.e., extend at an angle relative to the biasing axis 80, and extend in parallel relationship to one another. Further, the cords 90 of one support layer 88A may extend in a different direction and/or angle relative to the other support layer 88B.

When the biasing device 76 is loaded in the direction of the biasing axis 80, as a result of the application of the applied force $F_1$, a height H of the biasing device 76 decreases, i.e., the biasing device compresses. Additionally, an outer diameter $D_{OD}$ of the biasing device 76 may radially expand. The cords 90 of one or more of the reinforcing layers 88 may provide a restraint force to provide an increasing resistance to the compression of the biasing device 76. Further, the cords 90 within each reinforcing layer 88 may be configured to control the radial displacement of the cords 90 as the biasing device 76 is compressed.

The biasing device 76 is configured to have a spring rate that increases as a function of the amount of force $F_1$ that is applied to the apply surface 74 of the trapdoor assembly 32 increasing. As such, the biasing device 76 may be configured such that a predefined force $F_1$ is required to be applied to the apply surface 74 by the translation member 30 before the trapdoor assembly 32 will move the required distance from the closed position 62 (first distance $D_1$) to the open position 64 (second distance $D_2$). In one embodiment, the activation force $F_A$ required to move the trapdoor assembly 32 from the closed position 62 to the open position 64 is at least 889.6 newtons (N) (approximately 200 pounds (lbs)). More preferably, the force $F_1$ required to move the trapdoor assembly 32 from the closed position 62 to the open position 64 is at least 1179 N (approximately 400 lbs). It should be appreciated that, in the absence of a sufficient force $F_1$ being applied to the apply surface 74 of the trapdoor assembly 32, the biasing device 76 will not compress to the required height and the trapdoor assembly 32 will be prevented from pivoting from the closed position 62, i.e., first distance $D_1$ (FIG. 2) to the open position 64, i.e., second distance $D_2$ (FIG. 3).

The biasing device 76 is resilient. Therefore, in the absence of the application of the sufficient force $F_1$ to the apply surface 74, the restoring force $F_2$ of the biasing device 76 being applied to the trapdoor assembly 32 may cause the trapdoor assembly 32 to automatically return to the closed position 62, from the open position 64 as the height H of the biasing device 76 returns to the height H when not under a load created by the application of the force $F_1$.

In one non-limiting embodiment, the core 86 may define a passage 94 that extends therethrough, along the biasing axis 80. The core 86 defines an inner diameter $D_{ID}$. The smaller the inner diameter $D_{ID}$, the larger the force $F_1$ required to compress the biasing device 76. Therefore, the force $F_1$ required to sufficiently compress the biasing device 76 may be determined as a function of the inner diameter $D_{ID}$.

Additionally, changing the durometer, or hardness, of the elastomeric material of the core 86 can influence the force $F_1$ required to compress the biasing device 76 along the biasing axis 80.

With continued reference to FIG. 4, the biasing device 76 may also include a covering 96 that axially surrounds the reinforcing layer 88. The covering 96 may comprise an elastomeric material, such as rubber and the like. The covering 96 may provide resistance to abrasion and otherwise protect the reinforcing layers 88A, 88B.

The trapdoor assembly 32 may also include at least one return member 98 operatively interconnecting the stanchion 56 and the support structure 26. Preferably, the return member 98 is a pair of return members 98, where each return member 98 is operatively attached to a respective stanchion 56 and to the support structure 26. Each return member 98 may be a spring, such as a tension spring or extension spring. The return member 98 is configured to have a spring rate that is less than a spring rate of the biasing devices 76. In the absence of the force $F_1$ being applied to the apply surface 74 of the trapdoor assembly 32, the return member 98 assists the biasing device 76 in returning the housing 54 from the open position 64 to the closed position 62.

Additionally, referring to FIGS. 1-3, the trapdoor assembly 32 may also include at least one bumper 99. The bumpers 99 may be operatively attached to a respective stanchion 56 and/or the support structure 26 such that the bumpers 99 react between the stanchions 56, arcuately opposite the biasing devices 76. The bumpers 99 are configured to provide cushioning between the housing 54 and the support structure 26 when the trapdoor assembly 32 automatically returns to the closed position 62.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A conveyor assembly for movably supporting a tire of a vehicle, the conveyor assembly comprising:
    a track configured for supporting the tire of the vehicle;
    wherein the track terminates at an edge, and a gap is defined beyond the edge;
    a dolly configured to move along the track to the edge so as to guide the tire along the track to the edge;
    a trapdoor assembly configured to substantially cover the gap when in a closed position and movable to an open position to uncover the gap and allow the dolly to translate around the edge;
    wherein the trapdoor assembly includes a device configured to prevent a human from inadvertently opening the trapdoor assembly.

2. A conveyor assembly, as set forth in claim 1, wherein the device is configured to allow movement of the trapdoor assembly to the open position, in response to the dolly applying a force to the trapdoor assembly that is at least equal to an activation force.

3. A conveyor assembly, as set forth in claim 2, wherein the activation force is at least equal to 1779 newtons (N).

4. A conveyor assembly, as set forth in claim 2, wherein the device is a biasing device operatively disposed between the housing and a reaction surface;
    wherein the biasing device is resilient and configured to provide resistance to movement of the trapdoor assembly to the open position.

5. A conveyor assembly, as set forth in claim 4, wherein the biasing device is a compression spring extending along a biasing axis such that the biasing device is configured to be compressed along the biasing axis in response to the force being applied to the housing by the dolly being at least equal to the activation force; and
    wherein the biasing device has a spring rate configured to increase as the force applied to the trapdoor assembly by the translation member increases.

6. A conveyor assembly, as set forth in claim 5, wherein the housing includes:
    a stanchion configured to pivot about a pivot axis;
    wherein the biasing device is operatively disposed between the stanchion and the reaction surface such that the biasing axis is generally perpendicular to, and non-coincident with, the pivot axis; and
    an apply member operatively attached to the stanchion;
    wherein the apply member is configured to be contacted by the dolly such that the trapdoor assembly pivots to the open position, when the force being applied by the dolly is at least equal to the activation force.

7. A conveyor assembly, as set forth in claim 5, wherein the apply member presents an apply surface facing the edge of the track; and
    wherein the biasing device is operatively disposed between the stanchion and the reaction surface such that the biasing device is disposed arcuately opposite the apply surface of the apply member.

8. A conveyor assembly, as set forth in claim 7, wherein the biasing device is operatively attached to the stanchion.

9. A conveyor assembly, as set forth in claim 2, wherein the trapdoor assembly is configured to automatically move to the closed position when the force applied to the trapdoor assembly is not at least equal to the activation force.

10. A conveyor assembly, as set forth in claim 1, wherein the device is configured to be in a locked state when the dolly is not proximate the edge of the track, such that the trapdoor assembly is prevented from moving to the open position; and
    wherein the device is configured to be in an unlocked state when the translation member is proximate the edge of the track, such that a human is prevented from opening the trapdoor assembly.

11. A conveyor assembly, as set forth in claim 10, wherein the device includes an actuator, configured to automatically move the trapdoor assembly to the open position when the device is in the unlocked state.

12. A trapdoor assembly for a conveyor assembly having a support structure, a track terminating at an edge, and a dolly movable along the track, the trapdoor assembly comprising:
    a trapdoor assembly configured to substantially cover a gap defined beyond the edge when in a closed position and movable to an open position to uncover the gap and allow the dolly to translate around the edge;
    wherein the trapdoor assembly includes a device configured to prevent a human from inadvertently opening the trapdoor assembly.

13. A trapdoor assembly, as set forth in claim 12, wherein the device is configured to allow movement of the trapdoor assembly to the open position, in response to the dolly applying a force to the trapdoor assembly that is at least equal to an activation force.

14. A trapdoor assembly, as set forth in claim 13, wherein the activation force is at least equal to 1779 newtons (N).

15. A trapdoor assembly, as set forth in claim 13, wherein the device is a biasing device operatively disposed proximate the housing;
wherein the biasing device is resilient and configured to provide resistance to movement of the trapdoor assembly to the open position.

16. A trapdoor assembly, as set forth in claim 15, wherein the biasing device is a compression spring extending along a biasing axis such that the biasing device is configured to be compressed along the biasing axis in response to the force being applied to the housing by the dolly being at least equal to the activation force; and
wherein the biasing device has a spring rate configured to increase as the force applied to the trapdoor assembly by the translation member increases.

17. A trapdoor assembly, as set forth in claim 16, wherein the housing includes:
a stanchion configured to pivot about a pivot axis;
wherein the biasing device is operatively disposed proximate the stanchion, such that the biasing axis is generally perpendicular to, and non-coincident with, the pivot axis; and
an apply member operatively attached to the stanchion;
wherein the apply member is configured to be contacted by the dolly, such that the trapdoor assembly pivots to the open position, when the force being applied by the dolly is at least equal to the activation force; and
wherein the biasing device is configured to be compressed along the biasing axis, by the stanchion, in response to the force being applied to the apply member by the dolly being at least equal to the activation force.

18. A trapdoor assembly, as set forth in claim 17, wherein the apply member presents an apply surface configured to face the edge of the track;
wherein the biasing device is operatively disposed proximate the stanchion, such that the biasing device is disposed arcuately opposite the apply surface of the apply member; and
wherein the apply surface is configured to be contacted by the dolly, such that the trapdoor assembly pivots to the open position, when the force being applied by the dolly is at least equal to the activation force.

19. A trapdoor assembly, as set forth in claim 18, wherein the biasing device is operatively attached to the stanchion.

20. A trapdoor assembly, as set forth in claim 13, wherein the trapdoor assembly is configured to automatically move to the closed position when the force applied to the trapdoor assembly is not at least equal to the activation force.

21. A trapdoor assembly, as set forth in claim 12, wherein the device is configured to be in an unlocked state when the translation member is in an operating position, such that the trapdoor assembly is movable to the open position; and
wherein the device is configured to be in a locked state when the dolly is not in the operating position by a human.

22. A trapdoor assembly, as set forth in claim 21, wherein the device includes an actuator, configured to automatically move the trapdoor assembly to the open position when the device is in the unlocked state.

* * * * *